United States Patent
Tucker

(10) Patent No.: US 9,523,577 B1
(45) Date of Patent: Dec. 20, 2016

(54) CARBON NANOTUBE TAPE VIBRATING GYROSCOPE

(71) Applicant: The United States of America as Represented by the Administrator of the National Aeronautics and Space Administration, Washington, DC (US)

(72) Inventor: Dennis Stephen Tucker, Huntsville, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 374 days.

(21) Appl. No.: 14/192,350

(22) Filed: Feb. 27, 2014

(51) Int. Cl.
G01P 3/44 (2006.01)
G01C 19/56 (2012.01)
B82Y 30/00 (2011.01)

(52) U.S. Cl.
CPC ............... *G01C 19/56* (2013.01); *B82Y 30/00* (2013.01)

(58) Field of Classification Search
CPC .................................................... G01P 15/125
USPC ......................................... 73/514.32, 504.12
See application file for complete search history.

(56) References Cited

U.S. PATENT DOCUMENTS

| 4,644,793 | A | 2/1987 | Church |
| 5,783,749 | A | 7/1998 | Lee et al. |
| 6,192,756 | B1 | 2/2001 | Kikuchi et al. |
| 6,282,956 | B1 * | 9/2001 | Okada .................. G01C 19/56 73/504.12 |
| 7,493,814 | B2 | 2/2009 | Whelan et al. |
| 7,581,443 | B2 | 9/2009 | Kubena et al. |
| 7,818,871 | B2 | 10/2010 | Shcheglov |
| 8,166,816 | B2 | 5/2012 | Ayazi et al. |
| 2005/0172714 | A1 | 8/2005 | Challoner et al. |
| 2007/0119258 | A1 | 5/2007 | Yee |
| 2009/0269560 | A1 | 10/2009 | Dhinojwala et al. |
| 2010/0242600 | A1 * | 9/2010 | Lin ...................... B81B 7/0074 73/504.12 |

(Continued)

FOREIGN PATENT DOCUMENTS

| CA | 2011/163129 A3 | 12/2011 |
| EP | 2353065 A1 | 8/2011 |

(Continued)

*Primary Examiner* — Paul West
*Assistant Examiner* — Xin Zhong
(74) *Attorney, Agent, or Firm* — Peter J. Van Bergen; James J. McGroary

(57) ABSTRACT

A vibrating gyroscope includes a piezoelectric strip having length and width dimensions. The piezoelectric strip includes a piezoelectric material and carbon nanotubes (CNTs) substantially aligned and polled along the strip's length dimension. A spindle having an axis of rotation is coupled to the piezoelectric strip. The axis of rotation is parallel to the strip's width dimension. A first capacitance sensor is mechanically coupled to the spindle for rotation therewith. The first capacitance sensor is positioned at one of the strip's opposing ends and is spaced apart from one of the strip's opposing faces. A second capacitance sensor is mechanically coupled to the spindle for rotation therewith. The second capacitance sensor is positioned at another of the strip's opposing ends and is spaced apart from another of the strip's opposing faces. A voltage source applies an AC voltage to the piezoelectric strip.

22 Claims, 2 Drawing Sheets

(56) References Cited

U.S. PATENT DOCUMENTS

2012/0141880 A1   6/2012  Burgess et al.

FOREIGN PATENT DOCUMENTS

| JP | 063153 | A | 1/1994 |
| JP | 3586271 | B2 | 11/2004 |
| WO | 2011/026100 | A1 | 3/2011 |

* cited by examiner

CARBON NANOTUBE TAPE VIBRATING GYROSCOPE

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to gyroscopes. More specifically, the invention is a vibrating gyroscope for small-scale applications.

2. Description of the Related Art

Gyroscopes are used in a variety of large-scale and small-scale applications to sense/measure angular movement or velocity. In small-scale applications, gyroscopes are typically a micro electromechanical system (MEMS) requiring some type of micro-machining of the components. For vibrating gyroscopes that include a piezoelectric ceramic or quartz, the required micro-machining is difficult and expensive.

SUMMARY OF THE INVENTION

Accordingly, an object of the present invention is to provide a gyroscope for small-scale applications.

Another object of the present invention is to provide a vibrating gyroscope.

Still another object of the present invention is to provide a vibrating gyroscope that is simple and relatively inexpensive to manufacture.

Other objects and advantages of the present invention will become more obvious hereinafter in the specification and drawings.

In accordance with the present invention, a vibrating gyroscope includes a piezoelectric strip having a length dimension and a width dimension. The piezoelectric strip defines opposing ends along its length dimension and opposing faces along its width dimension. The piezoelectric strip includes a piezoelectric material and carbon nanotubes (CNTs) substantially aligned and polled along the strip's length dimension. A spindle having an axis of rotation is coupled to the piezoelectric strip wherein the axis of rotation is parallel to the strip's width dimension. A first capacitance sensor is mechanically coupled to the spindle for rotation therewith. The first capacitance sensor is positioned at one of the strip's opposing ends and is spaced apart from one of the strip's opposing faces. A second capacitance sensor is mechanically coupled to the spindle for rotation therewith. The second capacitance sensor is positioned at another of the strip's opposing ends and is spaced apart from another of the strip's opposing faces. A voltage source applies an AC voltage to the piezoelectric strip.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
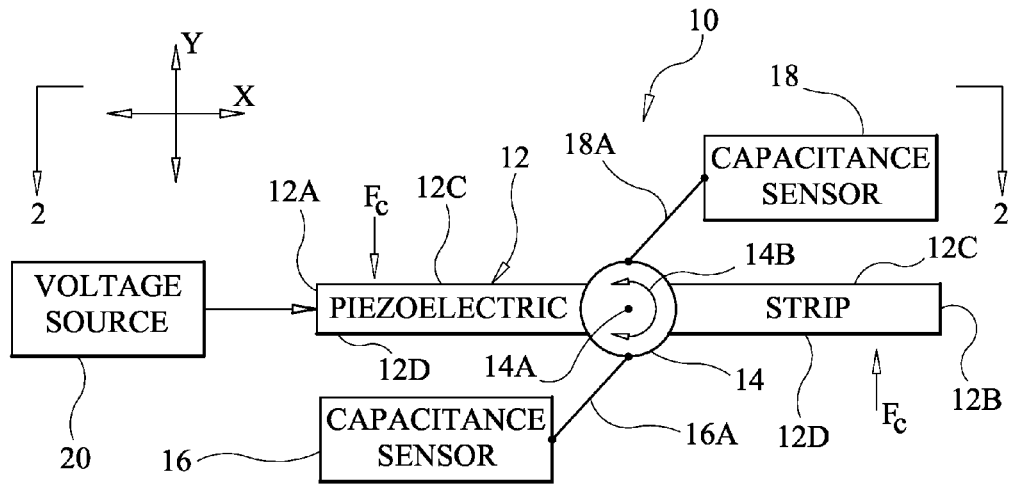
FIG. 1 is a schematic side view in the X-Y plane of a vibrating gyroscope in accordance with an embodiment of the present invention.
Figure 2:
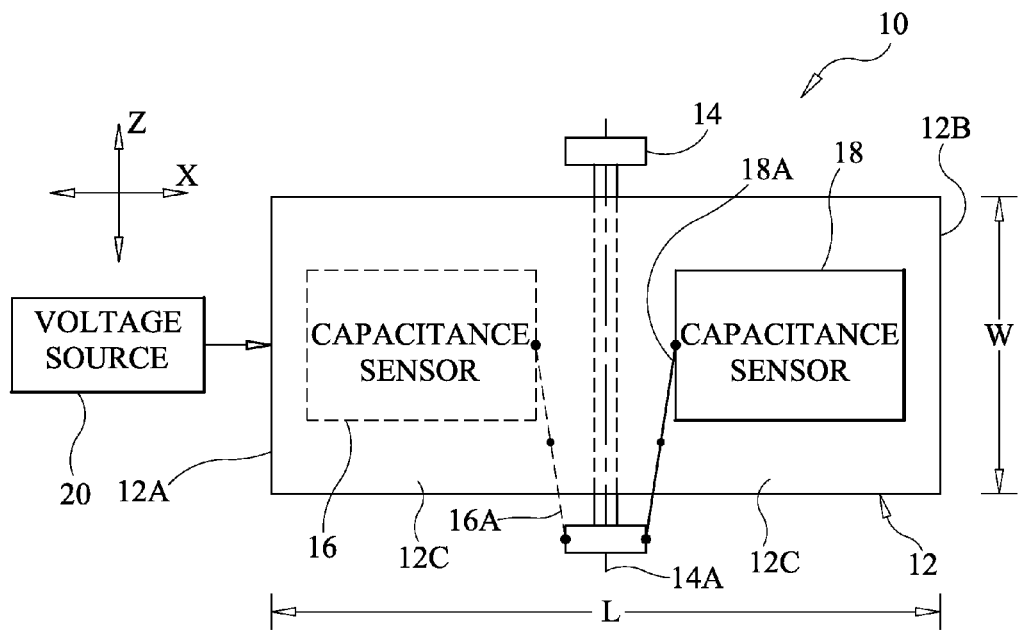
FIG. 2 is a schematic plan view in the X-Z plane of the vibrating gyroscope taken along line 2-2 in FIG. 1.

Referring now to the drawings and more particularly to FIGS. 1 and 2, a vibrating gyroscope in accordance with an embodiment of the present invention is shown schematically and is referenced generally by numeral 10. Gyroscope 10 exists and operates in three dimensions. Accordingly, for a clear understanding of the present invention, FIG. 1 illustrates gyroscope 10 in the X-Y plane and FIG. 2 illustrates gyroscope 10 in the X-Z plane as viewed along line 2-2 in FIG. 1.

Vibrating gyroscope 10 uses a piezoelectric strip 12 having a length "L" aligned along the X-dimension and a width "W" aligned along the Z-dimension. Strip 12 has opposing ends 12A/12B defined along its length, and has opposing parallel or substantially parallel faces 12C/12D where each of faces 12C and 12D spans the width and length of strip 12. Strip 12 is mounted on a spindle 14 whose axis of rotation 14A is aligned along, or is parallel to, the width dimension of strip 12 such that strip 12 can rotate about axis 14 as indicated by two-headed arrow 14B. Spindle 14 can be positioned such that its axis of rotation 14A is approximately centered between ends 12A and 12B of strip 12.

Vibrating gyroscope 10 also includes two capacitance sensors 16 and 18 positioned at ends 12A and 12B, respectively, of strip 12. More specifically, capacitance sensor 16 is adjacent to and spaced apart from face 12D near end 12A, while capacitance sensor 18 is adjacent to and spaced apart from face 12C near end 12B. Each of sensors 16 and 18 is mechanically coupled (as indicated by mechanical couplers 16A and 18A) to spindle 14 such that they rotate with strip 12/spindle 14. Each of sensors 16 and 18 generates capacitance measurement based on distance/spacing from face 12D and 12C, respectively.

Figure 3:
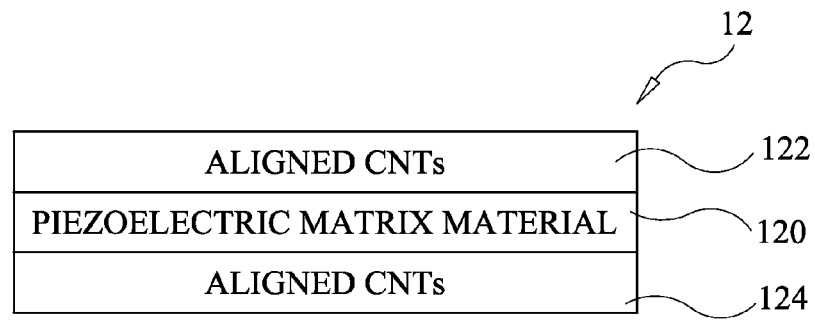
FIG. 3 is a schematic view of a piezoelectric strip construction in accordance with an embodiment of the present invention.
Figure 4:
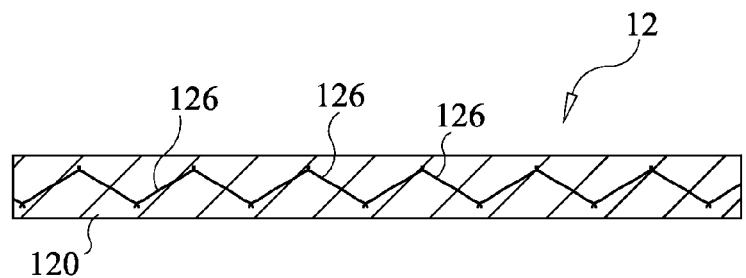
FIG. 4 is a cross-sectional view of a piezoelectric strip in accordance with another embodiment of the present invention.

In the present invention, piezoelectric strip 12 includes a matrix of piezoelectric material with carbon nanotubes (CNTs) aligned and polled along the length dimension of strip 12. For example, strip 12 can be a layered assembly as shown schematically in FIG. 3 where a piezoelectric material matrix layer 120 has layers 122 and 124 of aligned/polled CNTs disposed on opposing faces of piezoelectric material matrix layer 120. The CNTs are aligned/polled along the length of strip 12. In another embodiment of piezoelectric strip 12 illustrated in FIG. 4, the piezoelectric material matrix is illustrated in cross-section and is referenced by numeral 120 and the CNTs are referenced by numeral 126. CNTs 126 are substantially aligned along the length of strip 12. For purposes of the present invention, CNTs 126 can occupy approximately 30 to approximately 50 volume percent of strip 12.

In either embodiment of strip 12, piezoelectric material matrix 120 can be a flexible piezoelectric material such as polyvinylidene fluoride (P(VDF)) or polyvinylidene trifluoroethylene (P(VDF-TrFE)). To enhance the piezoelectric effect produced by piezoelectric strip 12, additives such as magnesium niobate-lead titanate (PMN-PT), lead zirconium titanate (PZT), and barium titanate (BaTiO$_3$) can be added to piezoelectric matrix 120.

A variety of techniques can be used to fabricate piezoelectric strip 12. For example, in terms of the embodiment illustrated in FIG. 4, piezoelectric matrix 120 could be sprayed onto CNTs 126 as the CNTs were being drawn and then wound onto a spool. The drawing of CNTs 126 will cause their substantial alignment as the matrix material is sprayed thereon. To facilitate spraying, the piezoelectric matrix material can be mixed into a solvent (e.g., DMF) that will ultimately evaporate leaving just the piezoelectric matrix material 120 encapsulating the substantially aligned CNTs 126. The desired lengths for strip 12 can then be cut.

Referring again to FIGS. 1 and 2, vibrating gyroscope 10 also includes a voltage source 20 capable of generating/supplying an AC voltage that is to be applied to piezoelectric strip 12. In general, voltage source 20 should be connected to strip 12 such that the AC voltage is applied along the length dimension of strip 12. The application of the AC voltage along the length of strip 12 (with CNTs aligned along the strip's length) causes strip 12 to vibrate in the X-dimension. Then, as strip 12 experiences rotation about axis 14A, a Coriolis force F$_C$ develops that will push respective ends 12A/12B of strip 12 towards sensors 16/18. The change in capacitance measured by each of sensors 16 and 18 can be used to determine the angular velocity Ω of strip 12 in accordance with the equation $$\delta C = 2\Omega v MC/dK$$

where δC is the differential capacitance detected at each sensor, v is the linear velocity of strip 12 in the x-dimension, C is the initial capacitance of the capacitance sensor before strip 12 is vibrated, d is the separation between the capacitance sensor and strip 12 before strip is vibrated, K is the stiffness of strip 12, and M is the mass of strip 12.

Figure 5:
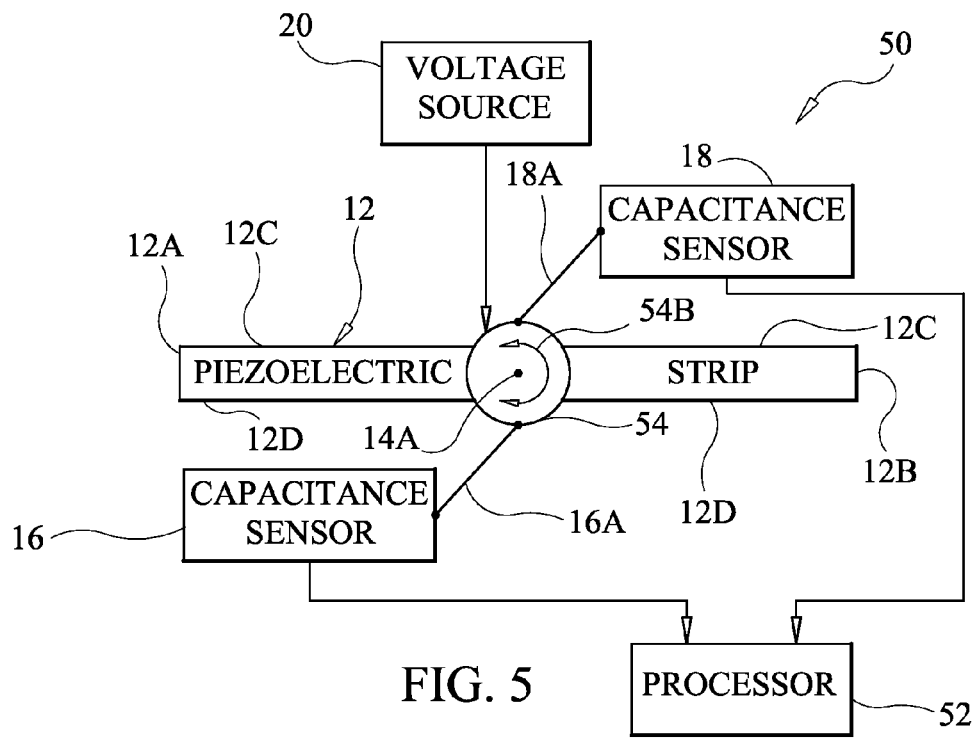
FIG. 5 is a schematic view of a vibrating gyroscope in accordance with another embodiment of the present invention.

Another embodiment of the present invention is illustrated in FIG. 5 where a vibrating gyroscope 50 includes a processor 52 and replaces spindle 14 with a spindle 54 that is electrically conductive (or has an electrically conductive portion or region) that is coupled to piezoelectric strip 12. In this embodiment, voltage source 20 is electrically coupled to the electrically conductive (portion of) spindle 54 so that the applied AC voltage is directed in both directions in the X-dimension of strip 12. Processor 52 is coupled to capacitance sensors 16 and 18 to receive their generated outputs and process same to determine angular velocity of the piezoelectric strip in accordance with the above-described mathematical relationship.

The advantages of the present invention are numerous. The vibrating gyroscope's piezoelectric strip utilizes aligned/polled CNTs to enhance strip's piezoelectric properties as well as to improve its strength and useful life. The CNT-inclusive piezoelectric strip can be constructed using low-cost manufacturing processes and results in a lightweight component. When paired with the other off-the-shelf and low-cost components of the vibrating gyroscope, the present invention can be utilized in a variety of small-scale applications to include aircraft and satellites, digital cameras, smart phones, computer tablets, etc.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A vibrating gyroscope, comprising:
   a piezoelectric strip having a length dimension and a width dimension, wherein said piezoelectric strip defines opposing ends along said length dimension and wherein said piezoelectric strip defines opposing faces spanning said length dimension and said width dimension, said piezoelectric strip including a piezoelectric material and carbon nanotubes (CNTs) substantially aligned and polled along said length dimension of said piezoelectric strip;
   a spindle having an axis of rotation, said spindle coupled to said piezoelectric strip wherein said axis of rotation is parallel to said width dimension of said piezoelectric strip;
   a first capacitance sensor mechanically coupled to said spindle for rotation therewith, said first capacitance sensor positioned adjacent to and spaced apart from one of said opposing faces in proximity to one of said opposing ends of said piezoelectric strip wherein said first capacitance sensor generates a first capacitance measurement based on a first distance between said first capacitance sensor and said one of said opposing faces;
   a second capacitance sensor mechanically coupled to said spindle for rotation therewith, said second capacitance sensor positioned adjacent to and spaced apart from another of said opposing faces in proximity to another of said opposing ends of said piezoelectric strip wherein said second capacitance sensor generates a second capacitance measurement based on a second distance between said second capacitance sensor and said another of said opposing faces; and
   a voltage source for applying an AC voltage to said piezoelectric strip wherein said piezoelectric strip vibrates along said length dimension and wherein, when said spindle rotates about said axis of rotation, a Coriolis force acts on said piezoelectric strip wherein said one of said opposing faces of said piezoelectric strip is pushed towards said first capacitance sensor and said another of said opposing faces of said piezoelectric strip is pushed towards said second capacitance sensor.

2. A vibrating gyroscope as in claim 1, wherein said piezoelectric strip comprises:
   a layer of said piezoelectric material having a first face and a second face;
   a first layer of CNTs disposed on said first face of said layer; and
   a second layer of CNTs disposed on said second face of said layer.

3. A vibrating gyroscope as in claim 1, wherein said CNTs are embedded in said piezoelectric material.

4. A vibrating gyroscope as in claim 1, wherein said axis of rotation of said spindle is approximately centered between said opposing ends of said piezoelectric strip.

5. A vibrating gyroscope as in claim 1, wherein said spindle is electrically conductive and wherein said voltage source is electrically coupled to said spindle for applying said AC voltage thereto.

6. A vibrating gyroscope as in claim 1, wherein said piezoelectric material is selected from the group consisting of polyvinylidene fluoride (P(VDF)) and polyvinylydene trifluoroethylene (P(VDF-TrFE)).

7. A vibrating gyroscope as in claim 1, further comprising additives mixed in said piezoelectric material, said additives being selected from the group consisting of magnesium niobate-lead titanate (PMN-PT), lead zirconium titanate (PZT), and barium titanate ($BaTiO_3$).

8. A vibrating gyroscope as in claim 2, further comprising additives mixed in said piezoelectric material, said additives being selected from the group consisting of magnesium niobate-lead titanate (PMN-PT), lead zirconium titanate (PZT), and barium titanate ($BaTiO_3$).

9. A vibrating gyroscope, comprising:
- a piezoelectric strip having a length dimension and a width dimension, wherein said piezoelectric strip defines opposing ends along said length dimension and wherein said piezoelectric strip defines opposing faces spanning said length dimension and said width dimension, said piezoelectric strip including a piezoelectric material and carbon nanotubes (CNTs) substantially aligned and polled along said length dimension of said piezoelectric strip;
- an electrically-conductive spindle having an axis of rotation, said spindle coupled to said piezoelectric strip wherein said axis of rotation is parallel to said width dimension of said piezoelectric strip and is approximately centered between said opposing ends of said piezoelectric strip;
- a first capacitance sensor mechanically coupled to said spindle for rotation therewith, said first capacitance sensor positioned adjacent to and spaced apart from one of said opposing faces in proximity to one of said opposing ends of said piezoelectric strip wherein said first capacitance sensor generates a first capacitance measurement based on a first distance between said first capacitance sensor and said one of said opposing faces;
- a second capacitance sensor mechanically coupled to said spindle for rotation therewith, said second capacitance sensor positioned adjacent to and spaced apart from another of said opposing faces in proximity to another of said opposing ends of said piezoelectric strip wherein said second capacitance sensor generates a second capacitance measurement based on a second distance between said second capacitance sensor and said another of said opposing faces; and
- a voltage source for applying an AC voltage to said spindle wherein said piezoelectric strip vibrates along said length dimension and wherein, when said spindle rotates about said axis of rotation, a Coriolis force acts on said piezoelectric strip wherein said one of said opposing faces of said piezoelectric strip is pushed towards said first capacitance sensor and said another of said opposing faces of said piezoelectric strip is pushed towards said second capacitance sensor.

10. A vibrating gyroscope as in claim 9, wherein said piezoelectric strip comprises:
- a layer of said piezoelectric material having a first face and a second face;
- a first layer of CNTs disposed on said first face of said layer; and
- a second layer of CNTs disposed on said second face of said layer.

11. A vibrating gyroscope as in claim 9, wherein said CNTs are embedded in said piezoelectric material.

12. A vibrating gyroscope as in claim 9, wherein said piezoelectric material is selected from the group consisting of polyvinylidene fluoride (P(VDF)) and polyvinylydene trifluoroethylene (P(VDF-TrFE)).

13. A vibrating gyroscope as in claim 9, further comprising additives mixed in said piezoelectric material, said additives being selected from the group consisting of magnesium niobate-lead titanate (PMN-PT), lead zirconium titanate (PZT), and barium titanate ($BaTiO_3$).

14. A vibrating gyroscope as in claim 12, further comprising additives mixed in said piezoelectric material, said additives being selected from the group consisting of magnesium niobate-lead titanate (PMN-PT), lead zirconium titanate (PZT), and barium titanate ($BaTiO_3$).

15. A vibrating gyroscope, comprising:
- a piezoelectric strip having a length dimension and a width dimension, wherein said piezoelectric strip defines a first end and a second end along said length dimension and wherein said piezoelectric strip defines a first face and a second face, each of said first face and said second face spanning said length dimension and said width dimension, said piezoelectric strip including a piezoelectric material and carbon nanotubes (CNTs) substantially aligned and polled along said length dimension of said piezoelectric strip;
- a spindle having an axis of rotation, said spindle coupled to said piezoelectric strip wherein said axis of rotation is parallel to said width dimension of said piezoelectric strip;
- a first capacitance sensor mechanically coupled to said spindle for rotation therewith, said first capacitance sensor positioned adjacent to and spaced apart from said first face in proximity to said first end for generating a first capacitance based on a distance from said first capacitance sensor to said first face;
- a second capacitance sensor mechanically coupled to said spindle for rotation therewith, said second capacitance sensor positioned adjacent to and spaced apart from said second face in proximity to said second end for generating a second capacitance based on a distance from said second capacitance sensor to said second face;
- a voltage source for applying an AC voltage to said piezoelectric strip wherein said piezoelectric strip vibrates along said length dimension and wherein, when said spindle rotates about said axis of rotation, a Coriolis force acts on said piezoelectric strip wherein said first face of said piezoelectric strip is pushed towards said first capacitance sensor and said second face of said piezoelectric strip is pushed towards said second capacitance sensor; and
- a processor coupled to said first capacitance sensor and said second capacitance sensor for generating an angular velocity of said piezoelectric strip rotating about said axis of rotation as said AC voltage is applied to said piezoelectric strip, wherein said angular velocity is based on said first capacitance and said second capacitance.

16. A vibrating gyroscope as in claim 15, wherein said piezoelectric strip comprises:
- a layer of said piezoelectric material having a first face and a second face;
- a first layer of CNTs disposed on said first face of said layer; and
- a second layer of CNTs disposed on said second face of said layer.

17. A vibrating gyroscope as in claim 15, wherein said CNTs are embedded in said piezoelectric material.

18. A vibrating gyroscope as in claim 15, wherein said axis of rotation of said spindle is approximately centered between said first end and said second end of said piezoelectric strip.

19. A vibrating gyroscope as in claim 15, wherein said spindle is electrically conductive and wherein said voltage source is electrically coupled to said spindle for applying said AC voltage thereto.

20. A vibrating gyroscope as in claim 15, wherein said piezoelectric material is selected from the group consisting of polyvinilydene fluoride (P(VDF)) and polyvinilydene trifluoroethylene (P(VDF-TrFE)).

21. A vibrating gyroscope as in claim 15, further comprising additives mixed in said piezoelectric material, said additives being selected from the group consisting of magnesium niobate-lead titanate (PMN-PT), lead zirconium titanate (PZT), and barium titanate ($BaTiO_3$).

22. A vibrating gyroscope as in claim 20, further comprising additives mixed in said piezoelectric material, said additives being selected from the group consisting of magnesium niobate-lead titanate (PMN-PT), lead zirconium titanate (PZT), and barium titanate ($BaTiO_3$).

* * * * *